(12) United States Patent
Galon et al.

(10) Patent No.: US 9,692,560 B1
(45) Date of Patent: Jun. 27, 2017

(54) METHODS AND SYSTEMS FOR RELIABLE NETWORK COMMUNICATION

(71) Applicant: QLOGIC Corporation, Aliso Viejo, CA (US)

(72) Inventors: Yoav Galon, Givatayim (IL); Rafi Shalom, Petah Tikva (IL); Amit Radzi, Tel-Aviv (IL)

(73) Assignee: QLOGIC Corporation, Aliso Viejo, CA (US)

( * ) Notice: Subject to any disclaimer, the term of this patent is extended or adjusted under 35 U.S.C. 154(b) by 118 days.

(21) Appl. No.: 14/663,912

(22) Filed: Mar. 20, 2015

Related U.S. Application Data

(60) Provisional application No. 62/023,088, filed on Jul. 10, 2014.

(51) Int. Cl.
*H04L 12/56* (2006.01)
*H04L 1/16* (2006.01)
*H04L 12/801* (2013.01)

(52) U.S. Cl.
CPC ............ *H04L 1/1628* (2013.01); *H04L 47/34* (2013.01)

(58) Field of Classification Search
CPC ..... H04L 67/1097; H04L 67/10; H04L 49/90; H04L 49/358
USPC ........................................ 709/212, 272, 230
See application file for complete search history.

(56) References Cited

U.S. PATENT DOCUMENTS

| | | | |
|---|---|---|---|
| 2008/0043750 A1* | 2/2008 | Keels .................. | H04L 49/9094 370/395.52 |
| 2011/0055510 A1* | 3/2011 | Fritz ......................... | G06F 7/00 711/169 |
| 2014/0078883 A1* | 3/2014 | Wang .................. | H04L 43/0847 370/216 |

OTHER PUBLICATIONS

InfiniBand Trade Association, Annex A14: Extended Reliable Connected (XRC) Transport Service, Mar. 2, 2009, pp. 1-43.*

* cited by examiner

*Primary Examiner* — Charles C Jiang
*Assistant Examiner* — Will Lin
(74) *Attorney, Agent, or Firm* — Klein, O'Neill & Singh, LLP

(57) ABSTRACT

Methods and systems for network communication are provided. One of the methods includes receiving an out of order packet at a requestor device that is communicably connected to a responder device; storing the out of order packet at an out of order buffer location; and sending a lossy reliable connection (LRC) packet to the responder device when selective acknowledgement (SACK) is supported between the requestor device and the responder device, with information regarding an updated sequence number in a LRC extended header (LRCETH) that indicates to the responder information regarding in-order packets that have been received by the requestor device.

18 Claims, 7 Drawing Sheets

METHODS AND SYSTEMS FOR RELIABLE NETWORK COMMUNICATION

CROSS-REFERENCE TO RELATED APPLICATION

This patent application claims priority to U.S. Provisional Patent Application, Ser. No. 62/023,088, filed on Jul. 10, 2014, under 35 USC 119(e), the disclosure of which is incorporated herein by reference in its entirety.

TECHNICAL FIELD

The present invention relates to network communication.

BACKGROUND

Computing systems are commonly used today. A computing system often communicates with a peripheral device for performing certain functions, for example, reading and writing information. Continuous efforts are being made to improve communication between network devices and systems.

SUMMARY

The various present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one aspect, a machine implemented method is provided. The method includes receiving an out of order packet at a requestor device that is communicably connected to a responder device; storing the out of order packet at an out of order buffer location; and sending a lossy reliable connection (LRC) packet to the responder device when selective acknowledgement (SACK) is supported between the requestor device and the responder device, with information regarding an updated sequence number in a LRC extended header (LRCETH) that indicates to the responder information regarding in-order packets that have been received by the requestor device.

In another aspect, a non-transitory, machine readable storage medium having stored thereon instructions for performing a method is provided. The machine executable code which when executed by at least one machine, causes the machine to: receive an out of order packet at a requestor device that is communicably connected to a responder device; store the out of order packet at an out of order buffer location; and send a lossy reliable connection (LRC) packet to the responder device when selective acknowledgement (SACK) is supported between the requestor device and responder device, with information regarding an updated sequence number in a LRC extended header (LRCETH) that indicates to the responder information regarding in-order packets that have been received by the requestor device.

In yet another aspect, a machine implemented method includes receiving a lossy reliable connection extended header (LRCETH) packet with a selective acknowledgement (SACK) block at a responder device communicating with a requestor device; blocks; processing the SACK block by the responder device and updating a data structure that tracks packet retransmission from the responder device to the requestor device; and retransmitting a packet from the responder device to the requester device, based on the SACK block information.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

Figure 1A:
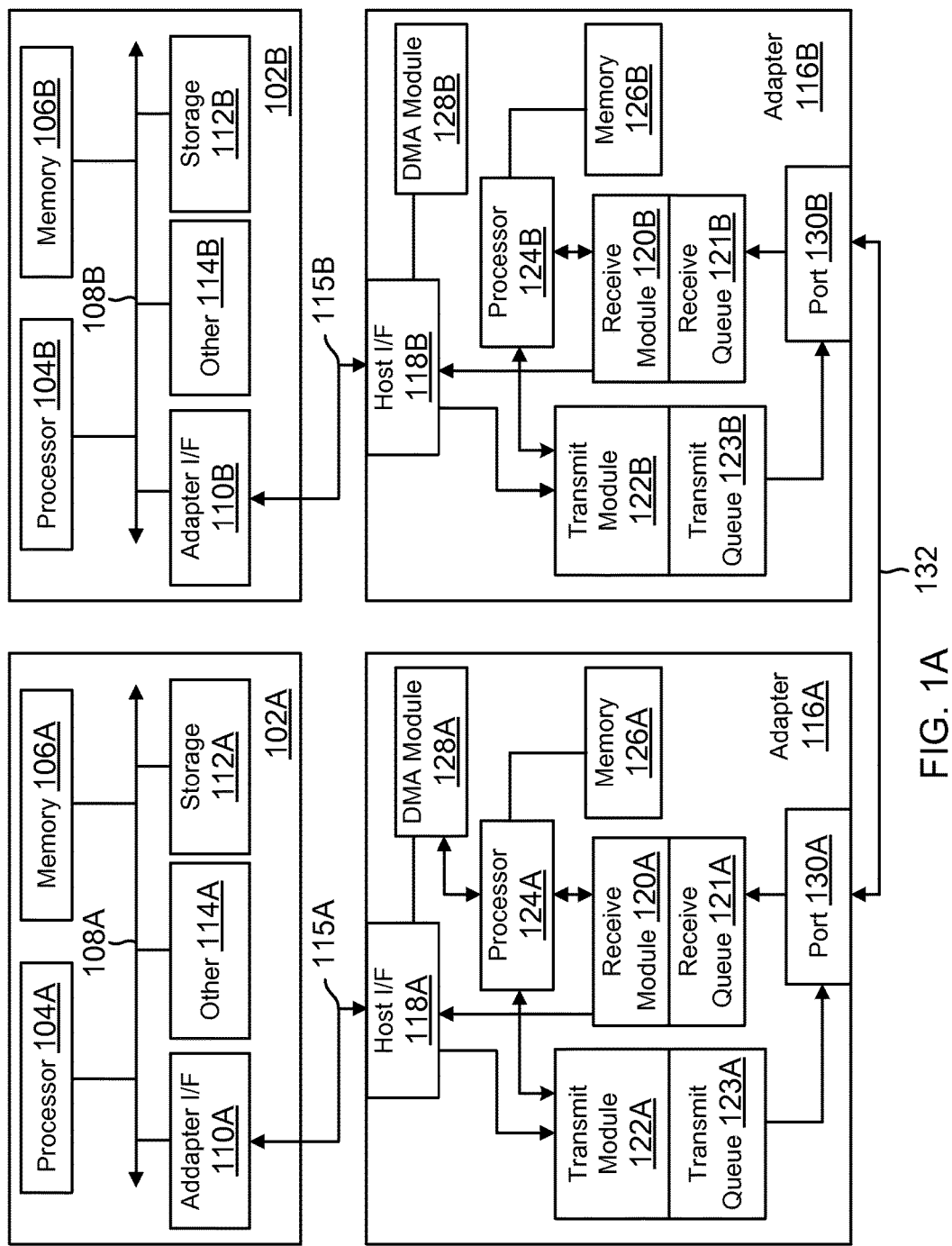
FIG. 1A is a functional block diagram of a computing system coupled to a network through an adapter.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

System:

FIG. 1A is a block diagram of a system 100 configured for use with the present embodiments. The system 100 may include one or more computing systems 102A/102B (may also be referred to as "host system 102" or host systems 102) each coupled to another device via a link 115A/115B, for example, an adapter 116A/116B that communicate with each other via a link 132. As an example, host systems 102A/102B with adapters' 116A/116B may operate as remote direct memory access (RDMA) nodes. Adapter 116A/116B may be referred to as requestor adapter (or simply as requestor) or a responder adapter (or responder). It is noteworthy that both adapters can be configured to operate as a requestor and the responder at the same time. Link 132 may be coupled to a network that may include, for example, additional computing systems, servers, storage systems, switches and other devices (not shown).

Adapters 116A/116B may be configured to handle both network and storage traffic. Various network and storage protocols may be used to handle network and storage traffic. Some common protocols InfiniBand (IB), Ethernet, Fibre Channel, Fibre Channel over Ethernet and others. IB is a switched fabric interconnect standard for servers, incorporated herein by reference in its entirety. IB technology is deployed for server clusters/enterprise data centers ranging from two to thousands of nodes. The IB standard is published by the InfiniBand Trade Association (IBTA). An IB switch is typically a multi-port device. Physical links (optical or copper) connect each port in a switch to another IB switch or an end device (for example, Target Channel Adapter (TCA) or a Host Channel Adapter (HCA). In the context of FIG. 1A, adapters 116A/116B may operate as HCA or TCA.

Host systems 102A/102B may include one or more processors 104A/104B, also known as a central processing units (CPUs). Processors 104A/104B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processors 104A/104B execute computer-executable process steps and interfaces with interconnects (or computer bus) 108A/108B, respectively. The computer buses 108A/108B may be, for example, a system bus, a Peripheral Component Interconnect (PCI) bus (or PCI-Express (PCIe) bus), a HyperTransport or industry standard architecture bus, a small computer system interface (SCSI) bus, a universal serial bus (USB), an Institute of Electrical and Electronics Engineers (IEEE) standard 1394 bus (sometimes referred to as "Firewire"), or any other interconnect type.

Adapter interface 110A/110B enable computing systems 102A/102B to interface with adapters 116A/116B via links 115A/115B, respectively. Links 115A/115B may be an interconnect system, for example, a PCIe bus. Host systems 102A/1102B also include other devices and interfaces 114A/114B, which may include a display device interface, a keyboard interface, a pointing device interface, etc. Details regarding the other devices 114A/114B are not germane to the embodiments disclosed herein.

Host systems 102A/102B may further include storage devices 112A/112B, which may be for example a hard disk, a CD-ROM, a non-volatile memory device (flash or memory stick) or any other mass storage device. Storage devices 112A/112B may store operating system program files, application program files, and other files. Some of these files are stored using an installation program.

Memory 106A/106B also interface to the computer buses 108A/108B to provide processors 104A/104B with access to memory storage. Memory 106A/106B may include random access main memory (RAM). When executing stored computer-executable process steps from storage devices 112A/112B, processors 104A/104B may store and execute the process steps out of RAM. Read only memory (ROM, not shown) may also be used to store invariant instruction sequences, such as start-up instruction sequences or basic input/output system (BIOS) sequences for operation of a keyboard (not shown).

Adapters 116A/116B interface with host systems 102A/102B via links 115A/115B and host interface 118A/118B respectively. In one embodiment, host interface 118A/118B may be a PCI Express interface having logic/circuitry for sending and receiving PCI-Express packets.

Adapters' 116A/116B may include processors 124A/114B, respectively that execute firmware instructions out of memory 126A/126B to control overall adapter operations and execute the process steps described below. Adapters' 116A/116B may also include storage (not shown), which may be for example non-volatile memory, such as flash memory, or any other device. The storage may store executable instructions and operating parameters that can be used for controlling adapter operations.

Adapters 116A/116B include transmit modules 122A/122B, for transmitting information. Each transmit module 122A/122B may maintain one or more transmit queues 123A/123B for staging packets before they are transmitted.

Adapters 116A/116B also includes receive modules 120A/120B for processing received packets. Receive modules also maintain receive queues 121A/121B for staging received packets before they are moved to the host computing systems.

Adapters' 116A/116B also include direct memory access (DMA) modules 128A/128B, respectively. DMA modules are used to manage access to links 115A/115B. The DMA modules use a plurality of DMA channels (not shown) for managing access to links 115A/115B. The DMA channels are typically used to move control structures such as input/output control blocks (IOCBs), input/output status blocks (IOSBs) and data between host system memory 106A/106B and the adapter memory 126A/126B, respectively.

Each adapter 116A/116B includes at least one port 130A/130B that communicates with each other using link 132. Ports 130A/130B include logic an circuitry for sending and receiving packets via link 132. For example, when ports 130A/130B use IB for communication, then ports 130A/130B include logic and circuitry to process IB packets.

Figure 1B:
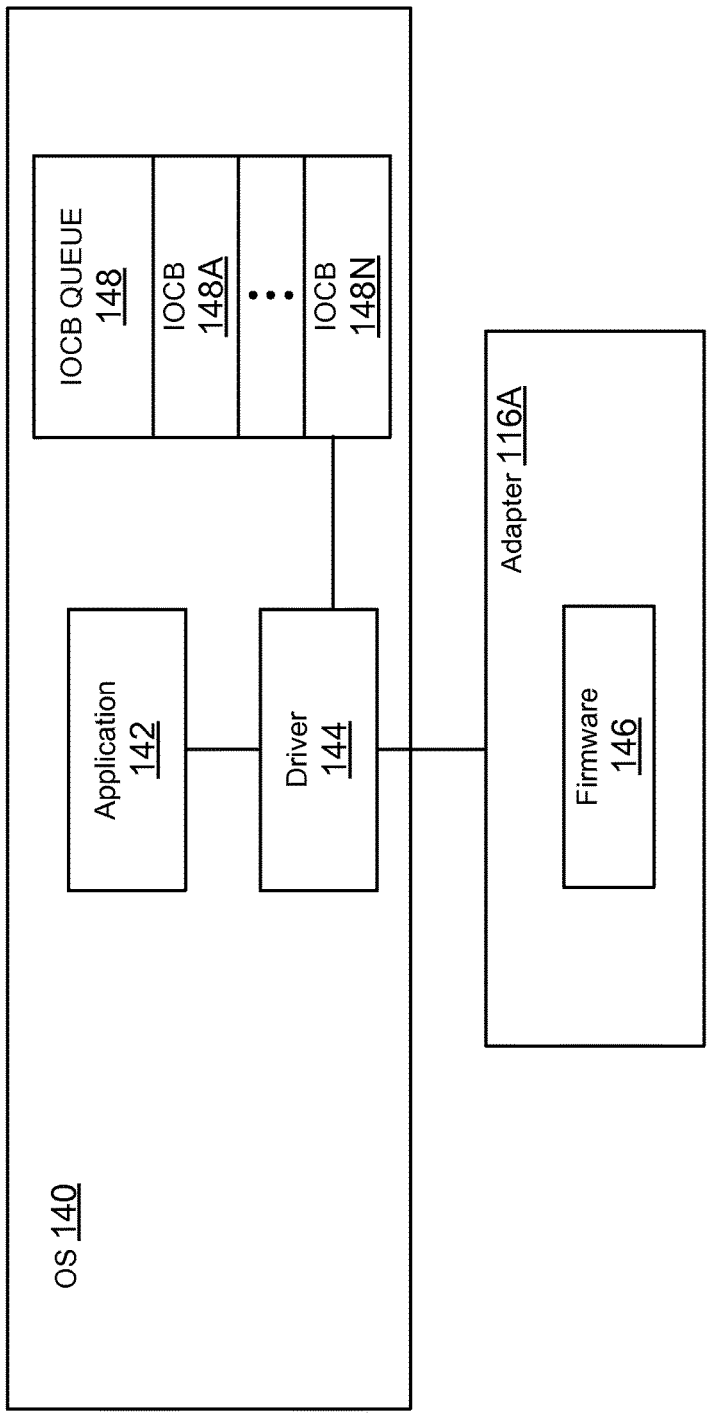
FIG. 1B shows a block diagram of a generic architecture used by the system of FIG. 1A.

FIG. 1B shows an example of a generic software architecture used by system 100. Although FIG. 1B only shows adapter 116A, the architecture is equally applicable to adapter 116B and host system 102B. Processor 104A executes an operating system 140 for controlling the overall operations of computing system 102A. The operating system may be Windows based, Linux operating system, Solaris, or any other operating system type. The embodiments disclosed herein are not limited to any particular operating system type.

An application 142 may be executed by processor 104A for performing certain functions. For example, application 142 may be an email program, a database application or any other application type. Application 142 may send a command to a driver 144 for performing an operation, for example, reading and/or writing data (input/output (I/O) at another storage device. The driver 144 processes the request and communicates with firmware 146 executed by processor 124A of adapter 116A.

Typically for managing data transfers across link 115A (or 115B), the following process steps are typically used: an IOCB (input/output control block) is first generated by the driver 144 and saved at an IOCB queue 148, shown as 148A-148N. The IOCB queue 148 may be at host memory 106A or any other location. The IOCB is obtained by adapter 116A which may be to provide data to host processor 104A or to send data provided by host processor 104A. Both IOCB fetch and data transfer operations are performed using DMA operations via DMA channels. Based on the IOCB, adapter 116A executes the operations that may be needed.

As an example, adapters' 116A/116B are configured to support RDMA over Ethernet (RoCE) and may be referred to as RDMA adapters or RDMA nodes. Each adapter may be a requester and as a responder. RDMA adapters allow zero-copy and kernel bypass to achieve high throughput, low latency networking. This means that the RDMA can access host memory without having to go through the operating system kernel of the host computing system. Today, there are two types of prevalent RDMA technologies that use Ethernet based networks, namely, Internet wide area RDMA protocol (may be referred to as "iWARP") and RoCE.

iWARP was published by a standards organization called Internet Engineering Task Force (IETF) as RFC 5040, RFC 5041 and RFC 5044. The iWARP standard specification describes using RDMA over the commonly used Transmission Control Protocol/Internet Protocol (TCP/IP) while maintaining the same software interface for IB applications, using an OpenFabrics Enterprise Distribution (OFED) software stack. The OFED software stack is provided by the Open Fabrics Alliance, a non-profit, standard organization and is used for RDMA bypass operations. OFED is available for both Linux and Windows Operating System environments, including: Red Hat Enterprise Linux (RHEL), Novell SUSE Linux Enterprise Distribution (SLES), Oracle Enterprise Linux (OEL) and Microsoft Windows Server operating systems (without derogation of any third party trademark rights).

RDMA over converged Ethernet (RoCE) was standardized by the IB Trade Association, a standard's organization. RoCE is derived from the main IB specification, replacing lower layers of the IB stack and uses Ethernet encapsulation.

Compared to iWARP, RoCE has been shown to have better performance, in terms of latency, CPU utilization and memory usage. RoCE is more efficiently deployed compared to iWARP, since it removes the need to support and optimize iWARP's associated RDDP (Remote direct data placement) layer within a network; and allows easier hardware based implementations. Yet, unlike iWARP, RoCE relies on the assumption of lossless Ethernet, as it lacks congestion avoidance and management layer such as TCP congestion windows that are used in iWARP. Thus currently before the various aspects disclosed herein, RoCE requires running over a converged Ethernet infrastructure to deploy Data Center Bridging (DCB) services. DCB as provided by IEEE 802.1 is a collection of standards-based extensions to classical Ethernet networks. DCB is intended to provide a lossless data center transport layer to enable convergence of LANs and SANs to a single unified fabric. More specifically, conventional RoCE implementation has to use IEEE 802.1Qbb priority flow control (PFC) to allow lossless medium, and requires IEE 802.1Qau quantized congestion notification (QCN) to avoid congestion within a network. Thus, essentially deploying conventional RoCE on a large scaled network becomes a problem as it requires that network entities, for example, network interface cards (NICs) and Switches, become DCB aware. This makes the RoCE solution an expensive upgrade and more complex to manage. The various aspects disclosed herein provide modifications or additions to the RoCE standard to make it more desirable and efficient.

The various aspects disclosed herein solve the problem of having to use lossless Ethernet in a network to deploy RoCE (and/or RoCE2 (Routable RoCE). More specifically, the various aspects described herein do not need to use DCB based, IEEE 802.1Qbb priority flow control and 802.1Qau congestion notification services.

In one aspect, a reliable connection (RC) service type is proposed for the RoCE standard and implemented by the RoCE adapters, as described below in detail. The various disclosed herein provide an efficient retransmission and Out-Of-Order handling mechanisms at a transport layer level to overcome packet loss, which may occur in the absence of flow control mechanisms provided by IEEE 802.1Qbb.

Current IB specification allows some level of recovery for dropped packets by implementing a very basic level of retransmission mechanism. However, packet losses are essentially treated as an error, and as such are treated very inefficiently. Moreover, in the absence of a congestion avoidance mechanism, conventional RoCE designs may lead to congestion within a network due to overloaded traffic flows, which may cause pause flooding. This leads to underutilization of the total available bandwidth in an entire network, as well as other undesired outcomes.

To overcome this problem, the various aspects disclosed herein provide novel congestion avoidance mechanisms within the RoCE transport level protocol to allow RoCE endpoints (for example, adapters 116A/116B) to adapt their transmission rates to a current load status of the network. The embodiments disclosed herein do not require any interface change in the software transport interface and related IB verbs. Therefore, the changes made to the standard are compatible with any application which is known to work over conventional RoCE connections.

The various aspects of the present disclosure are also compatible with RoCE implementations which do not support lossy reliable connection (LRC) capability. The LRC capability is negotiated between host systems (or adapters 116A/116B) by exchanging management parameters. In case both end points support LRC, all associated RoCE RC queue pairs (QP) run with LRC service type. In case at least one end point doesn't support LRC, both ends run the associated RoCE RC QPs with the standard RC service type. IB adapters use QPs to send and receive data. A QP has a receive and send segment at each adapter. An application may initiate a work queue element (WQE) for sending information. The adapter executes the WQE and posts a completion for the application. Before describing the details of the various aspects, the following describes certain IB/RDMA methodologies, including the use of QPs and WQE.

Figure 1C:
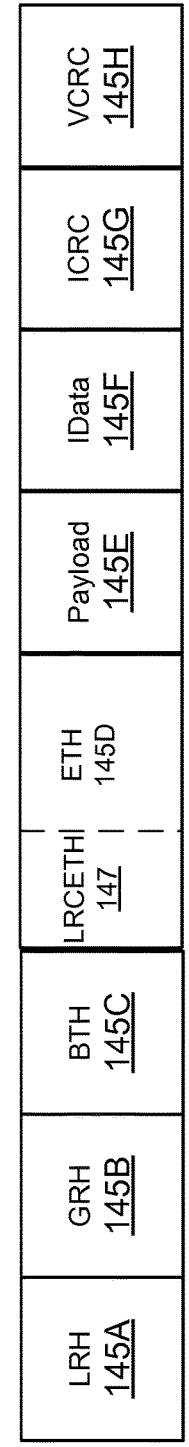
FIG. 1C shows an example of a header format, used according to the various aspects of the present disclosure.

Packet Format:

FIG. 1C shows an example of a modified IB data packet format 145. The packet format includes a LRH (Local routing header) 145A, GRH (global routing header) 145B, BTH (base transport header) 145C, ETH (Extended Transport Header) 145D, payload 145E, Idata 145F, iCRC (invariant cyclic redundancy code) 145G and vCRC (variant CRC) 145H. LRH 145A identifies local and destination ports. It is noteworthy that for the RoCE protocol, instead of LRH, the packet uses an Ethernet header instead. Details of the Ethernet header are not provided here. GRH 145B is used when a packet traverses multiple subnets. Format 145 also includes a LRCETH (Lossy Reliable Connection Extended Transport Header) 147 that is described below in detail. In one aspect, LRCETH 147 is part of ETH 145D.

BTH 145C is used for the transport layer protocol and specifies a destination QP, an operation code (OpCode), a packet sequence number (PSN) and partition. The opcode specifies if a packet is a Send packet, a RDMA read, RDMA write, an atomic request packet or an atomic response packet. The various adaptive aspects disclosed herein are not limited to any specific packet type of opcode type. The PSN is initialized as part of communication establishment between the adapters and each time a sending QP creates a new packet. The QP that receives a packet tracks the received PSN to determine if a packet is lost. For reliable service, the responder sends an acknowledgement (ACK) or a NACK to notify the sender that packets were received or not. In typical IB operations, for unacknowledged service, when a recipient detects a missing packet, it aborts current operation and discards subsequent packets. The various aspects described herein buffer out of order (OOO) packets, as described below.

iData 145F is intermediate data that is optionally present in a RDMA write operation and SEND and RDMA read response messages. It includes data that a consumer placed in a Send and RDMA write request and RDMA read response and a receiving QP places that value in a current receive WQE or a receive buffer, where RDMA write and read responses may be placed.

Figure 1D:
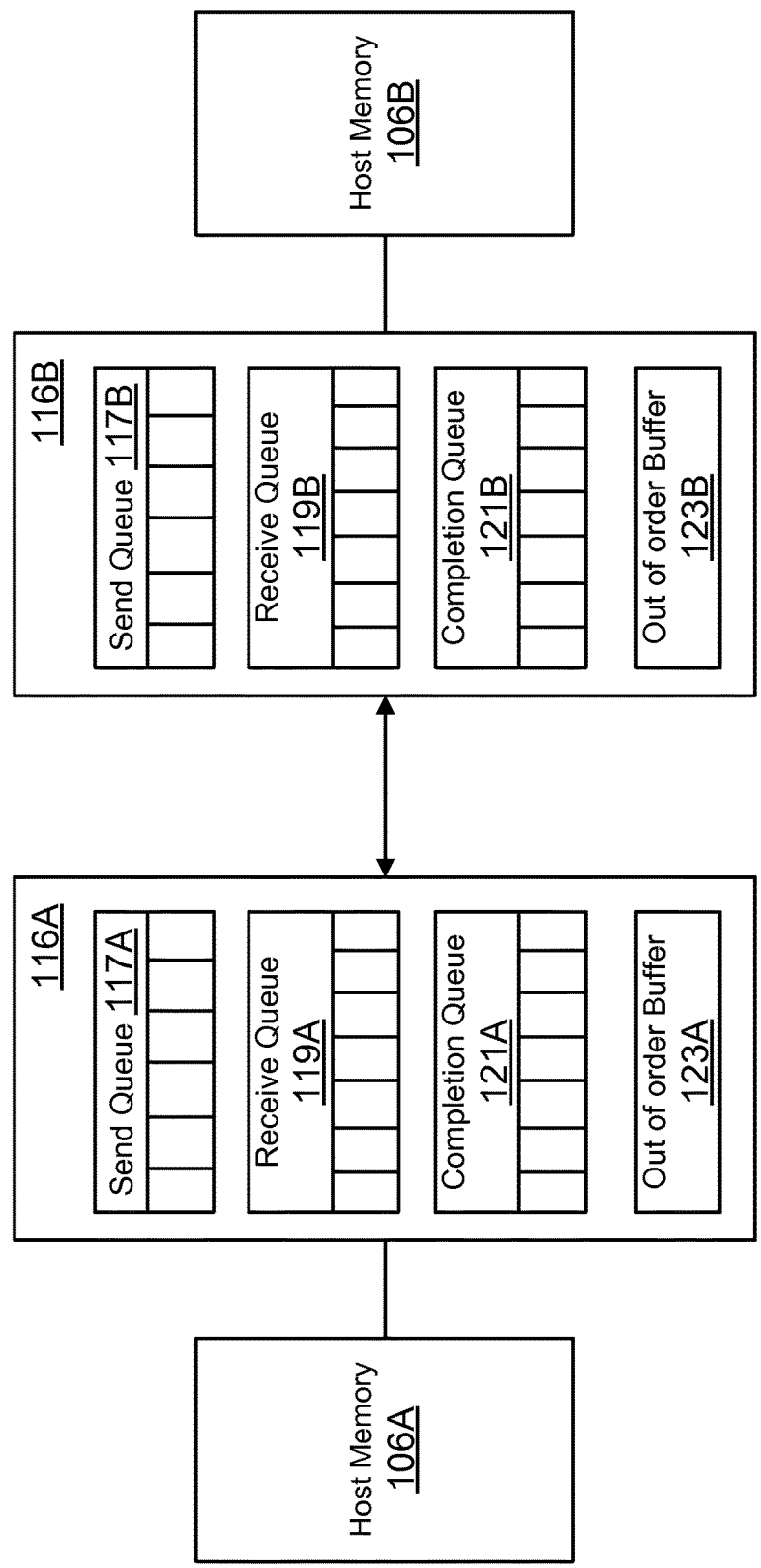
FIG. 1D shows an example of a queue pair (QP) used according to the various aspects of the present disclosure.

FIG. 1D shows an example of a QP used by adapters 116A/116B. Adapter 116A has a send queue 117A, receive queue 119A and a completion queue 121A, while adapter 116B has a send queue 117B, a receive queue 119B and a completion queue 121B. It is noteworthy that although only one completion queue is shown, there may be more than one completion queue for each adapter, for example, there may be a completion queue for Send operations and a completion queue for receive operations. Each adapter also maintains an out of order buffer (for example, 123A/123B) to manage out of order packets, as described below in detail. The QP is uniquely identified. It is noteworthy that each QP is associated with a completion queue, for example, a completion queue for Send operations and a completion queue for receive operation.

For a SEND operation, the host system allocates a send buffer in host memory 106A. The buffer is registered with adapter 116A. A WQE is placed at the send queue 117A. Adapter 116A executes the WQE and sends the message. On the receive side, the host system allocates a buffer in host memory 106B. When the message arrives from 116A, the message is placed at the host memory 106B and a completion is posted at the completion queue 121B.

For a RDMA write operation, a virtual address of the destination is also provided for the WQE. When the packet arrives at adapter 116B, it places the packet directly at the host memory 106B without any application involvement. To execute the RDMA write operation, both adapter 116A/116B exchange the addresses where the packet needs to be placed. For reliable transport service, the QPs maintain the PSNs and retransmit all the packet sin case a packet is dropped.

In one aspect, a new defined service type called "lossy" reliable connection (LRC) is provided. The transport level protocol changes suggested below apply to this new service type. This service type may be uniquely identified according to a BTH opcode field. As an example, a 3-bits prefix of the new service type can be 110. A 5-bit suffix of the opcode will remain similar to the RC ones with an additional new opcode for specifying a LRCETH only packet. This new opcode 5-bit suffix may be 11000, which is a reserved value for RC service type.

The following table shows an example of the new opcodes values:

| Code[7-5] | Code[4-0] | Description | Packet Contents following the Base Transport header*, ** |
|---|---|---|---|
| 110 Lossy Reliable Connection (LRC) | 00000 | SEND First | LRCETH, PayLd |
| | 00001 | SEND Middle | LRCETH, PayLd |
| | 00010 | SEND Last | LRCETH, PayLd |
| | 00011 | SEND Last with Immediate | LRCETH, ImmDt, PayLd |
| | 00100 | SEND Only | LRCETH, PayLd |
| | 00101 | SEND Only with Immediate | LRCETH, ImmDt, PayLd |
| | 00110 | RDMA WRITE First | LRCETH, RETH, PayLd |
| | 00111 | RDMA WRITE Middle | LRCETH, PayLd |
| | 01000 | RDMA WRITE Last | LRCETH, PayLd |
| | 01001 | RDMA WRITE Last with Immediate | LRCETH, ImmDt, PayLd |
| | 01010 | RDMA WRITE Only | LRCETH, RETH, PayLd |
| | 01011 | RDMA WRITE Only with Immediate | LRCETH, RETH, ImmDt, PayLd |
| | 01100 | RDMA READ Request | LRCETH, RETH |
| | 01101 | RDMA READ response First | LRCETH, AETH, PayLd |
| | 01110 | RDMA READ response Middle | LRCETH, PayLd |
| | 01111 | RDMA READ response Last | LRCETH, AETH, PayLd |
| | 10000 | RDMA READ response Only | LRCETH, AETH, PayLd |
| | 10001 | Acknowledge | LRCETH, AETH, optional SACKETH |
| | 10010 | ATOMIC Acknowledge | LRCETH, AETH, AtomicAckETH |
| | 10011 | CmpSwap | LRCETH, AtomicETH |
| | 10100 | FetchAdd | LRCETH, AtomicETH |
| | 10101 | Reserved | Undefined |

-continued

| Code[7-5] | Code[4-0] | Description | Packet Contents following the Base Transport header*, ** |
|---|---|---|---|
| | 10110 | SEND Last with Invalidate | LRCETH, IETH, PayLd |
| | 10111 | SEND Only with Invalidate | LRCETH, IETH, PayLd |
| | 11000 | LRCETH only | LRCETH, optional SACKETH |
| | 11001-11111 | Reserved | Undefined |
| 111 | 00000-11111 | Manufacturer Specific OpCodes | Undefined |

** LRCETH only" and "Acknowledge opcodes can optionally have lossy reliable connection a SACK extension header (SACKETH (Selective Acknowledgement Extended Transport Header) added right after the very last extension.

The following provides an example of an LRCETH 147, where the header may be 8 Bytes long and include the following fields:

Acknowledge sequence number in bytes (4 bytes)—specifies an amount of bytes that were received in-order by an associated QP for an associated requester (for example, 116A or 116B) or responder (according to the opcode value—See table below).

Acknowledge sequence valid (1 bit)—specifies whether an acknowledge sequence number field value is valid or not. This allows implementation flexibility for an adapter vendor to not always set an actual value in the "Acknowledge sequence number" field.

Number of SACK isles ( )—the number of SACKETH blocks specified in this packet. This field is valid only for "acknowledge" and "LRCETH only" packets. This field is ignored for any other packet types.

| | Bits | | | |
|---|---|---|---|---|
| Bytes | 31-24 | 23-16 | 15-8 | 7-0 |
| 0-3 | Acknowledge Sequence Number | | | |
| 4-7 | Reserved | Rsrv | Num SACK Isles | Valid |

LRCETH only 147 Packet Format: This is a new packet format for LRC, with a new opcode, which includes the LRCETH after the BTH with no payload. There may be SACKETH blocks right after the LRCETH. This packet is sent by a requester to a responder. The PSN indicated in the BTH is set to the most updated PSN value based on what a requester received in-order as a data receiver.

The following table specifies for whom the associated LRCETH header refers to as data receiver, Requester or Responder:

| Code[4-0] | Description | Associates to |
|---|---|---|
| 00000 | SEND First | Requester |
| 00001 | SEND Middle | Requester |
| 00010 | SEND Last | Requester |
| 00011 | SEND Last with Immediate | Requester |
| 00100 | SEND Only | Requester |
| 00101 | SEND Only with Immediate | Requester |
| 00110 | RDMA WRITE First | Requester |
| 00111 | RDMA W32RITE Middle | Requester |
| 01000 | RDMA WRITE Last | Requester |
| 01001 | RDMA WRITE Last with Immediate | Requester |
| 01010 | RDMA WRITE Only | Requester |
| 01011 | RDMA WRITE Only with Immediate | Requester |
| 01100 | RDMA READ Request | Requester |

-continued

| Code[4-0] | Description | Associates to |
|---|---|---|
| 01101 | RDMA READ response First | Responder |
| 01110 | RDMA READ response Middle | Responder |
| 01111 | RDMA READ response Last | Responder |
| 10000 | RDMA READ response Only | Responder |
| 10001 | Acknowledge | Responder |
| 10010 | ATOMIC Acknowledge | Responder |
| 10011 | CmpSwap | Requester |
| 10100 | FetchAdd | Requester |
| 10101 | Reserved | |
| 10110 | SEND Last with Invalidate | Requester |
| 10111 | SEND Only with Invalidate | Requester |
| 11000 | LRCETH only | Requester |

SACKETH may be in blocks of 8 bytes, up to 32 bytes: In one embodiment, SACKETH is an LRC optional extended transport header. SACKETH blocks may appear on "ACK" and "LRCETH only" packets. On "ACK" packets, SACKETH blocks appears right after the AETH part. On "LRCETH only" packets, SACKETH blocks appears right after the SACKETH part. Each SACKETH block represents one of the non-contiguous blocks of data that have been received and queued by the associated data receiver. There might be up to 4 such block on any specific packet. The number of blocks actually appearing on a packet is derived from the "number of SACK isles" field in the LRCETH header.

Each SACKETH block may include the following fields:

Left edge PSN sequence—the PSN of the first packet in the block indicates a packet that was buffered and is kept as part of the out of order data by a remote data receiver (for example, adapter 116B when it receives out of order data).

Right edge PSN sequence—the PSN of the last packet in the block indicates a packet that was buffered and is kept as part of the out of order data by a remote associated data receiver. Note that both left edge and right edge field may have the same PSN value.

| | Bits | | | |
|---|---|---|---|---|
| bytes | 31-24 | 23-16 | 15-8 | 7-0 |
| 0-3 | Left PSN | | | Reserved |
| 4-7 | right PSN | | | Reserved |

Communication Management:

In one embodiment, the methods and systems described herein maintain a fully compatible verbs interface, compared to the one defined for RC service type. Therefore, as part of the communication management traffic which is associated with the creation of a specific QP, ADAPTERS 116a/116b negotiate whether they are capable of supporting LRC transport level service type. If negotiation fails, both ends will fall back to working in RC mode. Otherwise, if negotiation succeeds, it is assumed that all packets sent from the associated QPs will always be LRC ones.

Implementing Flow Control:

In one embodiment, the "Acknowledge sequence number" field in the LRCETH packet is used for estimating how much data is outstanding on link 132. Bytes are accounted from the data payload portion of the packet. A data receiver may either set or reset the "acknowledge sequence valid" bit in the LRCETH header on any specific packet. The data receiver also ensures that the most updated "ack sequence" is sent to the data transmitter with minimal delay. The "acknowledge sequence valid" field provides flexibility in an implementation where the "acknowledge sequence number" are avoided on certain packets.

Based on the estimated number of outstanding bytes, each data sender manages a "congestion window", which defines a maximum allowed number of outstanding bytes at any given time. The congestion window size is initialized to a pre-defined value. As long as data is being sent and acknowledgements keep arriving, the data sender may gradually increase its congestion window size. Whenever congestion is being used, the congestion window size is decreased in response to congestion in the network.

More specifically, the congestion window size may be increased in two segments. For example, initially the congestion window size may be increased at a higher rate until a set threshold value is reached. After reaching the threshold value, the congestion window size increase may be gradual, for example, in a linearly. When a data receiver determines that packets have been lost, the congestion window size is decreased (for example, halved) and the threshold value is dynamically updated.

Implementing Out of Order (OOO) Packets Buffering:

Out of order packets received by a data receiver are detected according to the BTH PSN field. Instead of discarding the OOO packets and starting all over, the data receiver may buffer them in a way which allows data receiver to access those packets later on. Data receiver, either as requester or responder re-process the OOO packets, once the missing packets arrive.

Implementing Retransmissions:

Current IB\RoCE specifications (i.e. without the enhancements proposed herein) handle packet drops in the following manner: A requester, as a data sender, detects that transmitted packets were lost by receiving a NAK (Not Acknowledged) sequence error packet. This causes the requester to stop current transmission, and then retransmit all the packets, starting from the indicated PSN in the NAK sequence error packet. The responder, as a data receiver, drops all out of order packets, and waits until all packets, i.e. ones that were lost in the network as well as ones that were received out-of-order and dropped, are retransmitted back from the sender.

The requestor, as a data sender, may also have its retransmission timer expired, indicating that the response packet (including possibly a NAK sequence error packet) have been lost in the network. This effectively causes the requester to stop current transmission, and retransmit all the packets, starting from a last acknowledged PSN (or possibly even start retransmitting from an "older" PSN, which is the beginning of a work queue which was partially lost).

The responder, as a data sender, cannot detect packet losses. It simply obeys retransmitted requests it receives from the requestor. The various aspects disclosed herein provide alternatives for applying effective retransmission mechanisms in order to overcome possible packet losses. The various alternatives are described below in detail.

Implementing Retransmissions without SACKETH:

In one embodiment, either a requester or responder, as a data receiver, indicates detected packet losses back to its peer. For example, the requester, as a data receiver, may send "LRCETH only" packet for each out-of-order packet it received and buffered. The responder, as a data receiver, may send "acknowledge" packet for each out-of-order packet it received and buffered.

Using the foregoing, whenever the requester or responder, each as data sender, receives a pre-defined number of consecutive "acknowledge" or "LRCETH only" packets, respectively (will be referred to as acknowledge packets), where all packets have the same PSN value less than a most recent transmitted one, it may perform the following:

Save a current, most updated, transmitted PSN value; and issue a single packet retransmission which is associated with the acknowledged PSN. The data sender will remain in the retransmission state as long as most updated acknowledged PSN is less than the saved transmitted PSN. Once the acknowledged PSN becomes greater than or equal to the saved PSN, the data sender will exit the retransmission state and return to regular transmission. While in the retransmission state, the data sender continues to transmit new packets (data sender may possibly be limited by a congestion window or by any other protocol related barriers such as fences.). While in retransmission state, for every acknowledge packet that makes some progress in PSN (but in which the PSN is still less than saved PSN value), data sender retransmits one packet which is associated with the newly acknowledged PSN.

Implementing Retransmissions with SACKETH:

In one embodiment, either a requester or responder, as a data receiver, indicates detected packet losses using an optionally added SACKETH blocks that are sent to the peer. A requester, as a data receiver, may send "LRCETH only" packet with SACKETH blocks for each out-of-order packet it received and buffered. The responder, as a data receiver, may then send an "acknowledge" packet with SACKETH blocks for each out-of-order packet it received and buffered.

Each SACKETH block, transmitted by the data receiver, holds information of a single out-of-order consecutive group of packets, which will be referred to as an "isle", that are buffered by the data receiver. An isle maybe defined as group of packets which can be processed in order one after the other. This does not imply that PSN numbers for all the packets are consecutive. For example, multiple in-order RDMA read requests maybe considered as an isle although their PSN numbers may not be consecutive in the sense that each RDMA read request increments the next PSN value to transmit by the number of expected RDMA read response packets.

Since the requester or responder, as data receiver, may buffer multiple out-of-order consecutive groups of packets, there may be also multiple SACK blocks sent on a single "acknowledge" or "LRCETH only" packets, respectively (also referred to as acknowledge packets). For example, there may be up to 4 SACK blocks on a single acknowledge packet. Thus, a requester or responder, each as data receiver, can receive an out-of-order packet and buffer it. This packet is associated with an existing or a new isle. The requester or responder, each as data receiver, can also receive an in-order packet, which is processed, while there are still existing out-of-order buffered isles. In both cases, the data receiver may choose to send an acknowledge packet as a reply. This acknowledge packet may contain SACKETH blocks which reflect most updated state of buffered isles.

In another aspect, SACKETH blocks with the acknowledge packet maybe ordered as follows:

SACKETH blocks, appearing in the acknowledge packet, may be ordered according to a PSN range associated with each block. SACKETH blocks in the acknowledge packet, may represent the most recently reported SACK blocks, while the first SACK block appearing in the packet represents the most recently updated block which triggered the acknowledgement. Furthermore, one may choose to restrict the maximum number of supported out-of-order isles, which are buffered by the data receiver, to some defined or negotiated number.

In one aspect, a requester or responder, may process SACKETH blocks received on incoming acknowledge packets as follows:

The requestor or responder as a data sender maintains an image of already seen "SACKed" PSN ranges. The term "SACKed" refers to PSN ranges which were already seen on previously received SACKETH blocks. The data sender will update the image of the "SACKed" PSN ranges according to: New SACK information in a received acknowledge packet; and most updated acknowledge PSN number seen (as reflected by PSN value in the BTH of the acknowledge packet). After receiving acknowledge packets with SACK-ETH blocks, the data sender starts retransmitting packets, which are associated with packets that were already transmitted but are not within the "SACKed" PSN ranges and have not been acknowledged yet. Once all packets have been retransmitted, the data sender may choose to continue transmitting packets starting from the most updated PSN transmitted (data sender may possibly be limited by a congestion window or by any other protocol related barriers such as fences).

Figure 2:
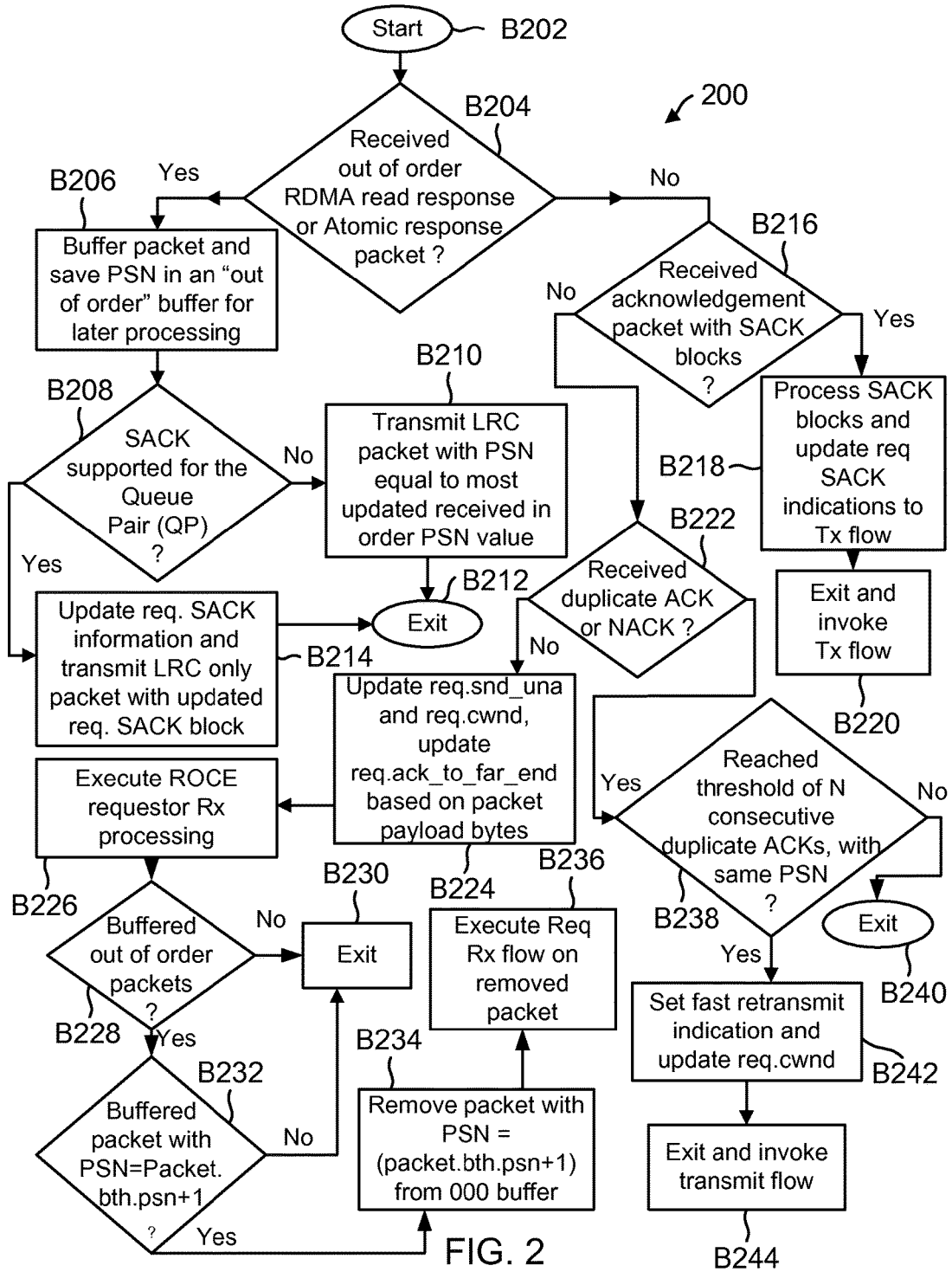
FIG. 2 shows a process for handling packets by a requestor adapter, according to one aspect of the present disclosure.

Process Flows:

FIG. 2 shows a process 200 for processing received packets at a requestor, according to one aspect. A requestor in this example may be adapter 116A or adapter 116B, described above with respect to FIG. 1A. The process begins in block B202, when both adapters 116A and 116B are initialized and operational.

In block B204, the requestor determines if it has received an out of order RDMA read response or an out of order atomic response packet. If yes, then in block B206, the received packet is buffered in an out of order buffer (for example, 123A) at the requestor adapter (not shown). The PSN of the received packet is also saved. The requestor in block B208 determines if SACK is supported for the QP for which the packet is received. In one aspect, adapters' 116A/116B execute a negotiation process flow to negotiate SACK capability. If SACK is not supported, then a LRC packet is transmitted with the PSN equal to a most updated received, in order PSN. The requestor adapter tracks the PSN of all the packets that are received. The process then ends in block B212.

If SACK is supported for the QP, then in block B214, the Req.SACK information is updated according based on the packet's PSN and a LRC packet is transmitted with the most updated SACK block and packet.lrceth.ack_seq_number being equal to req.ack_to_far_end.

Req.SACK refers to SACK related parameters that are maintained by the requester portion of a QP context. "packet.lrceth.ack_seq_number" being equal to req.ack_to_far_end" means that the "Ack_seq_number" (ACK sequence number) field that is defined in the new LRCETH is being set to a value which is saved in the "ack_to_far_end" requester associated context variable. This context field maintains a sequence number which is associated with the number of bytes that were received and processed in order by the requester.

In one aspect in block B214, the requestor builds a local data structure (not shown) that will include information on what packets have been received and what packets are missing so that the missing packets can be retransmitted. The process then moves to block B212 and ends.

Referring back to block B204, if an out of order packet is not received, then in block B216, the adapter determines if an ACK packet with SACK blocks have been received. If yes, then in block B218, the SACK blocks are processed and Req.SACK indications are updated on a transmit side. This is done to build a data structure that can track what packets have to be re-transmitted. Thereafter, in block B220, the transmit flow is invoked, as described below in detail.

If an acknowledgement packet with SACK blocks is not received in block B216, then in block B222, the adapter determines if a duplicate ACK or NAK has been received. The duplicate acknowledged packet is defined by the bth.PSN and lrceth.ack_seq_num values. If both these values are the same for more than one packet, then the acknowledgment packet is considered to be a duplicate. If not, then in block B224, then the adapter updates a data structure that tracks req.snd_una (i.e. unacknowledged packets based on the acketh.lrceth.ack_seq_num. A congestion window maintained by the requestor is also updated based on the packet payload. In block B226, the packet is processed.

In block B228, the process determines if there are any buffered out of order packets. If not, then process ends in block B230. If yes, then in block B232, the process determines if there is a buffered packet with PSN that equals packet.bth.psn +1. If not, then the process exits in block B230. If yes, then the packet is removed from the out of order buffer in block B234 and processed in block B236.

Referring back to block B222, if a duplicate ACK or NACK is received, then in block B238, the adapter determines if it has reached a threshold value of N consecutive duplicate ACKs. If not, the process ends in block B240. If yes, then in block B242, then a fast retransmit indicator is set and the req.cwnd is updated. Thereafter, the transmit flow is invoked in block B244.

Figure 3:
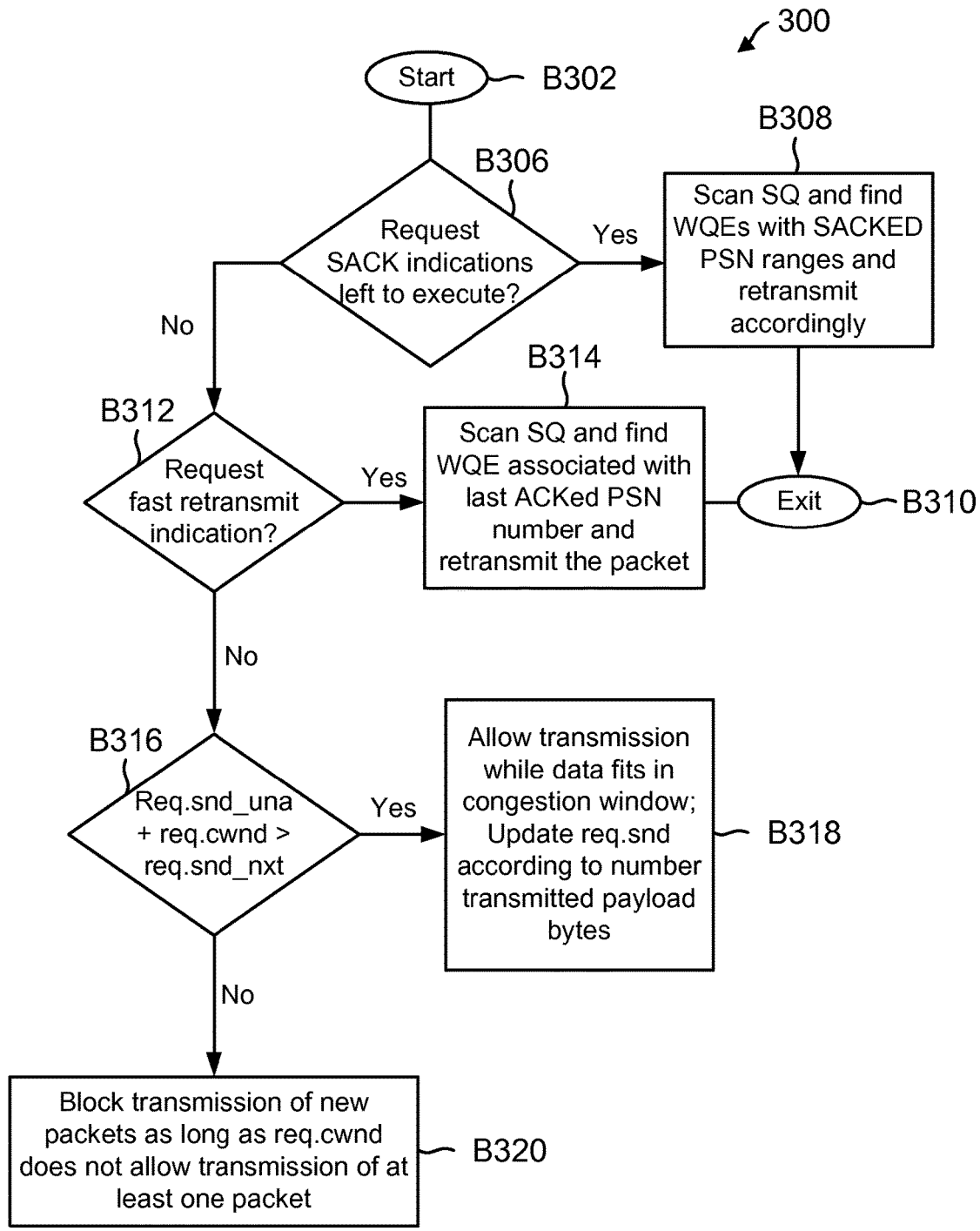
FIG. 3 shows a transmit process flow of a requestor adapter, according to one aspect of the present disclosure.

FIG. 3 shows a process 300 for transmitting packets at a requestor, according to one aspect. The process begins in block B302, when both adapters (i.e. requestor and responders) are operational. In block B306, the adapter determines if there are Req.SACK packets that need to be transmitted, after an out of order packet is received. The requestor maintains a data structure to track SACK packets so that it can transmit the appropriate packets. If yes, then the adapter scans the send queue (SQ) and finds the WQE associated with the last acknowledged PSN number. The packet is retransmitted in block B308. The process then ends in block B310. If there is no indication of SACK information according which needs to be retransmitted in block B306, then in block B312, the adapter determines to see if there is req. fast_retransmit indication. The fast retransmit is set in block B242, described above with respect to FIG. 2. If yes, then in block B314, the adapter scans the send queue and the finds the WQE associated with the last acknowledged PSN and retransmits the packet. The process then ends.

If there is no fast retransmit indication, then in block B316, the adapter determines if the req.snd_una plus req.cwnd is greater than req.snd_nxt to determine if it can transmit one more packet.

The req.snd_una is a value that tracks unacknowledged packets. req.snd_una is a byte sequence maintained in a requester QP context, and is updated by the ack_seq_number field in the LRCETH header, whenever a new packet is received. Req.cwnd is a calculated congestion window size, in bytes of payload—meaning how many bytes the requester is allowed to transmit relative to the req.snd_una value. Req.snd_nxt is a byte sequence associated with a next payload byte that the requester will transmit in the next packet. In order to be able to transmit, the requester enforces the following condition: req.snd_una+req.cwnd >req.snd_nxt+number-of-bytes-to-transmit. If yes, then in block B318, transmission is allowed, while data fits in congestion window. The req.snd is updated according to a number of RoCE payload bytes that are transmitted. If transmission is not permitted, then in block B320, transmission of new packets is blocked.

Figure 4:
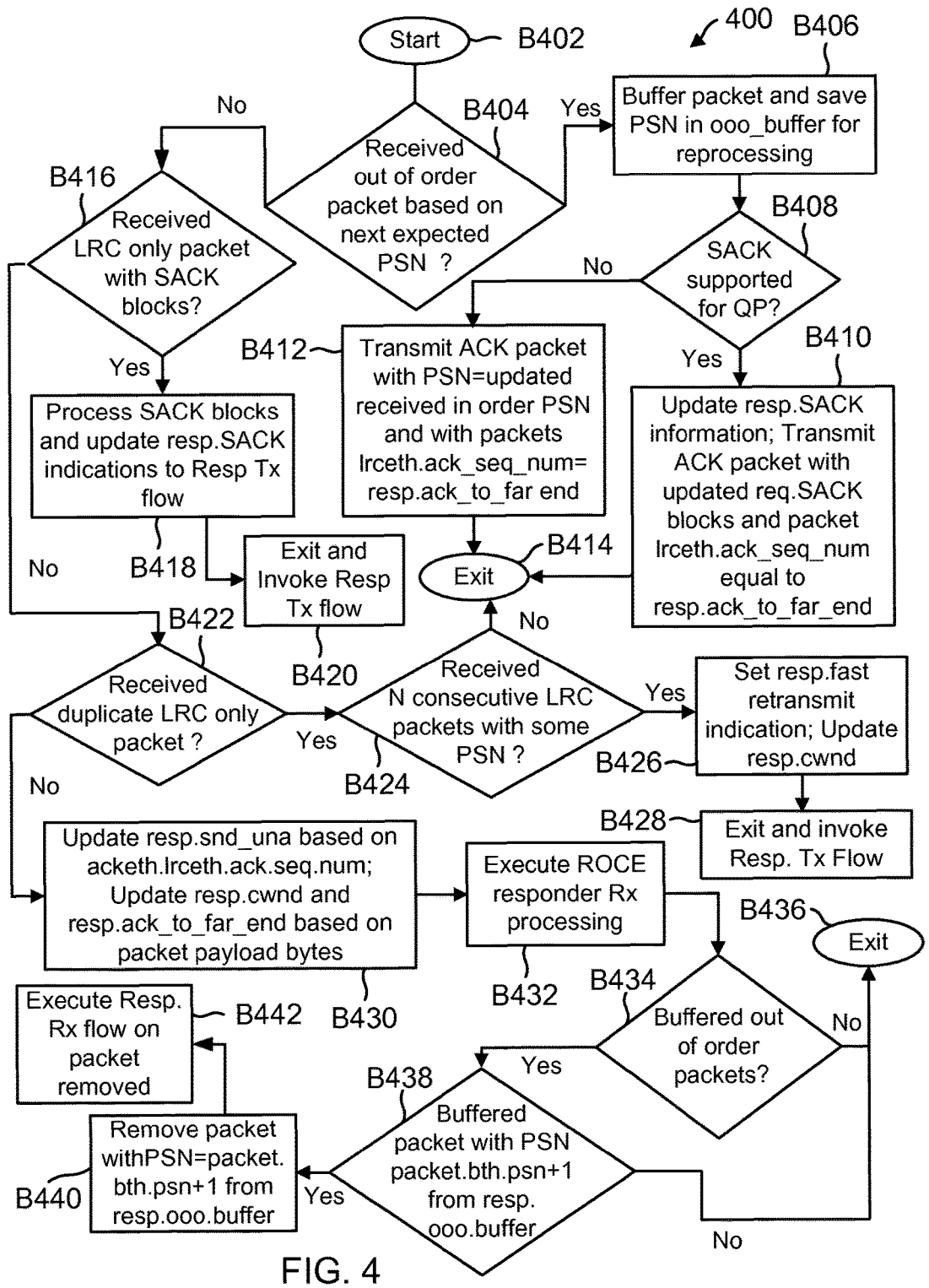
FIG. 4 shows a process for handling packets by a responder adapter, according to one aspect of the present disclosure.

FIG. 4 shows a process 400 for processing received packets at a responder, according to one aspect. This may be for any packet type, for example, a RDMA read, write request, an atomic request and others. As an example, assume that adapter 116B is a responder. The process begins in block B402. In block B404, the process determines if an out of order packet has been received at the responder. This may be based on a PSN that the responder tracks to ensure in-order packet delivery. If an out of order packet is received, then in block B406, the responder buffers the packet at out of order buffer 123B and saves the PSN for later processing. In block B408, the responder determines if SACK is supported for the QP for which the packet is received. If yes, then in block B410, the response SACK information is updated based on the packet PSN. An ACK packet with updated SACK information is transmitted. The ACK packet also includes the most updated packet.lcreth.ack.seq.num. The process then ends in block B414.

If SACK is not supported, as determined in block B408, then in block B412, the ACK packet is transmitted by the responder with a PSN that is equal to the last PSN number for a packet that was received in order. This allows the sender to re-send packets that may have been dropped. The process then ends in block B414.

In block B404, if an out of order packet is not received, then in block B416, the responder determines if the packet is an LRC packet with SACK blocks. If yes, then in block B418, the SACK blocks are processed. The resp.SACK indication is updated in the transmit workflow. The process then moves to the responder transmit flow in block B420 that is described below with respect to FIG. 5.

If the received packet is not a LRC packet with SACK blocks, then in block B422, the responder determines if the received packet is a duplicate LRC only packet. If yes, then in block B424, the responder determines if it has received N number of consecutive LRC packets with the same PSN. If yes, then in block B426, the congestion window is updated and a fast re-transmit indicator is set for the transmit workflow. Thereafter, the process moves to the transmit workflow in block B428. If N number of LRC packets have not been received, then the process ends.

If duplicate LRC packet is not received in block B422, then in block B430, the send unacknowledged (snd.una) packet count is updated based on ackreth.lrceth.ack.seq_num. The congestion window (resp.cwnd) and res.ack_to_far_end is updated. Thereafter, in block B432, regular RoCE processing in executed by the responder receive logic. In block B434, the responder determines if it has buffered out of order packets. If not, then process ends in block B436. If yes, then in block B438, the responder determines if the buffered packets has a PSN that is greater by 1. If not, then the process ends. If yes, then in block B440, the packet with the higher PSN is removed from the out of order buffer. In block 442, the removed packet is processed.

Figure 5:
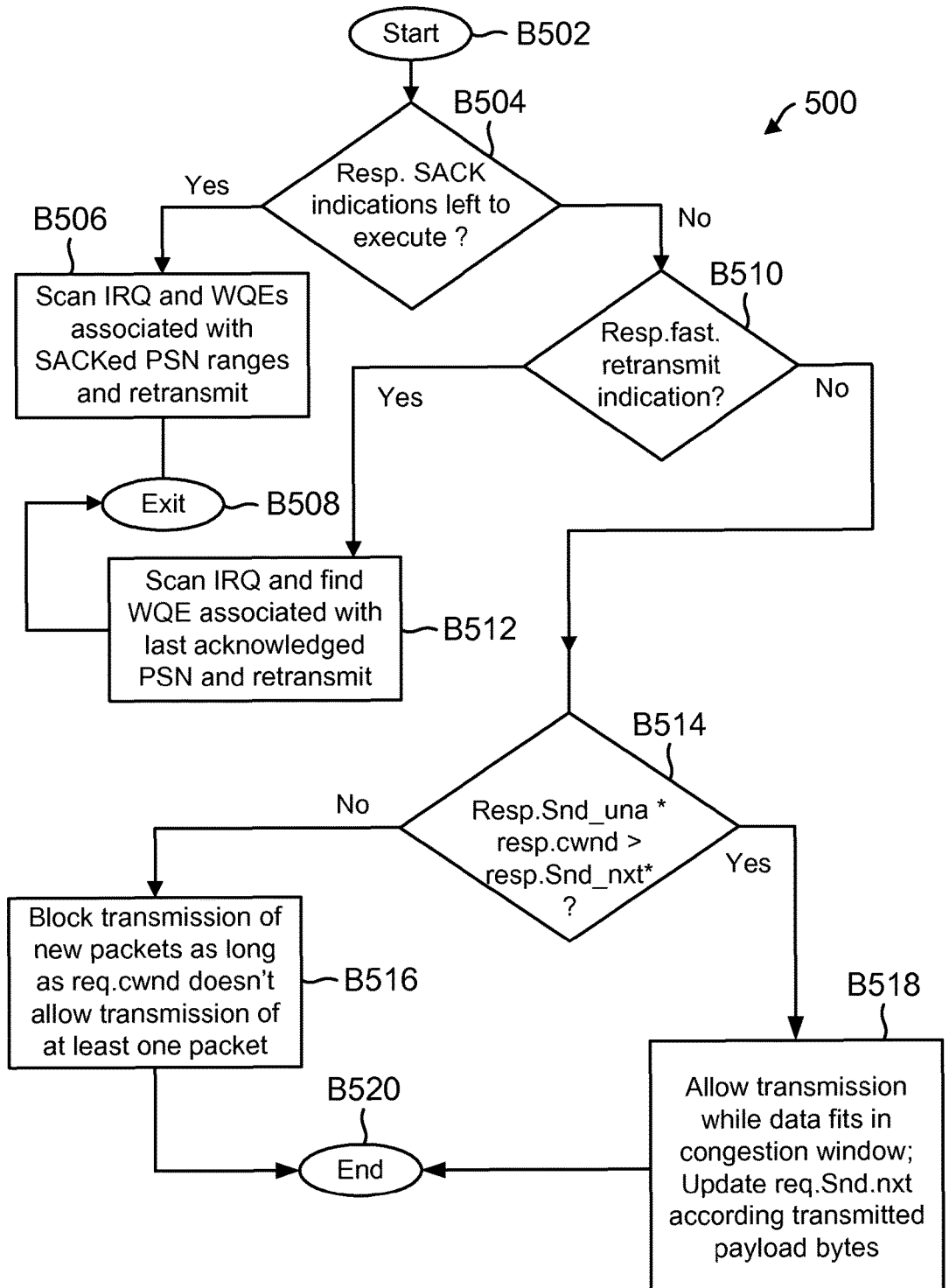
FIG. 5 shows a transmit process flow of a responder adapter, according to one aspect of the present disclosure.

FIG. 5 shows a process 500 for transmitting packets at a responder adapter (for example, 116B), according to one aspect. The process begins in block B502, when the responder and requestor adapter are initialized and operational. In block B504, the responder adapter determines if there are any Resp.SACK indications that need to be executed. If yes, then in block B506, the adapter scans its Inbound request queue (IRQ) and WQEs associated with the SACked PSN ranges and retransmits the packets accordingly. The process then ends in block B508.

If there are no Resp.SACK indications left to execute, then in block B510, the adapter determines if there are any fast retransmit indicators. If yes, then the adapter scans the IRQ and finds the WQE associated with a lasted acknowledged PSN and retransmits the last ACKed packet. The process then ends.

If there is no Resp-fast retransmit indicator, then in block B514, the adapter determines if resp.snd_una plus the congestion window size is greater than resp.snd_nxt. If no, then in block B516, the transmission of new packets is stopped as long as the congestion window does not allow transmission of a single packet. If yes, then in block B518, transmission is allowed, while packet size can fit the congestion window. The req.snd_nxt is updated based on payload size that is transmitted. Thereafter, the process ends in block B520.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. For example, the embodiments disclosed herein are applicable to any peripheral device and are not limited to any particular adapter type. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A machine implemented method, comprising:
    receiving an out of order packet at a requestor device that is communicably connected to a responder device for a connection;
    storing the out of order packet at an out of order buffer location and saving a packet sequence number (PSN);
    determining that selective acknowledgement (SACK) is supported between the requestor device and the responder device for the connection;
    sending a lossy reliable connection (LRC) packet to the responder device when selective acknowledgement (SACK) is supported between the requestor device and the responder device, with information regarding an updated sequence number in a LRC extended header (LRCETH) that indicates to the responder device information regarding in-order packets that have been received by the requestor device;

sending by the requestor device the LRC packet with an updated in-order PSN value, when SACK is not supported between the requestor device and the responder device;

determining that an acknowledgement packet with a SACK block has been received, when a received packet at the requestor device is not an out of order packet;

processing the SACK block for the acknowledgement packet and updating a data structure that tracks retransmit packets from the requestor device; and invoking a retransmit process to retransmit packets from the requestor device to the responder device.

2. The method of claim 1, further comprising:

receiving a duplicate acknowledgement (ACK) packet or a not acknowledgement packet at the requestor device when the received packet at the requestor device is not an out of order packet and the acknowledgement packet with the SACK block is not received; and invoking a retransmit flow after a threshold number of duplicate ACK packets have been received.

3. The method of claim 1, wherein the requestor device and the responder device are remote direct memory access (RDMA) nodes.

4. The method of claim 3, wherein the RDMA nodes are configured to process InfiniB and packets.

5. The method of claim 4, wherein the LRCETH is included in an extended header (ETH) of each InfiniB and packet.

6. The method of claim 5, wherein the LRCETH includes an acknowledgement sequence number indicating an amount of in order data that was received by a queue pair (QP).

7. A machine implemented method, comprising:

receiving a lossy reliable connection (LRC) extended header (LRCETH) packet with a selective acknowledgement (SACK) block at a responder device communicating with a requestor device;

processing the SACK block by the responder device and updating a data structure that tracks packet retransmission from the responder device to the requestor device;

retransmitting a packet from the responder device to the requester device, based on the SACK block information;

for a non-LRC packet without a SACK block received at the responder device, determining by the responder device that the non-LRC packet without a SACK block is a duplicate LRC packet;

determining by the responder device that the responder device has received N duplicate packets with a same packet sequence number; and updating a congestion window with an indicator for re-transmit workflow;

for an out of order packet received at the responder device and for supported SACK transmission, the responder device transmitting an acknowledgement packet with updated SACK information.

8. The method of claim 7, wherein the requestor device and the responder device are remote direct memory access (RDMA) nodes.

9. The method of claim 8, wherein the RDMA nodes are configured to process InfiniB and packets.

10. The method of claim 9, wherein the LRCETH is included in an extended header (ETH) of each InfiniB and packet.

11. The method of claim 10, wherein the LRCETH includes an acknowledgement sequence number indicating an amount of in order data that was received by a queue pair (QP).

12. The method of claim 7, wherein when a duplicate LRCETH packet is received at the responder device, then a retransmit flow is invoked after a threshold number of duplicate acknowledgement packets have been received.

13. The storage medium of claim 7, the machine executable code further causing the machine to:

receive a duplicate acknowledgement (ACK) packet or a not acknowledgement packet at the requestor device when the received packet at the requestor device is not an out of order packet and the acknowledgement packet with the SACK block is not received; and invoke a retransmit flow after a threshold number of duplicate ACK packets have been received.

14. A non-transitory, machine readable storage medium having stored thereon instructions for performing a method, comprising machine executable code which when executed by at least one machine, causes the machine to:

receive an out of order packet at a requestor device that is communicably connected to a responder device for a connection;

store the out of order packet at an out of order buffer location and saving a packet sequence number (PSN);

determine that selective acknowledgement (SACK) is supported between the requestor device and the responder device for the connection;

send a lossy reliable connection (LRC) packet to the responder device when SACK is supported between the requestor device and the responder device, with information regarding an updated sequence number in a LRC extended header (LRCETH) that indicates to the responder device information regarding in-order packets that have been received by the requestor device;

send by the requestor device the LRC packet with an updated in-order PSN value, when SACK is not supported between the requestor device and the responder device;

determine that an acknowledgement packet with a SACK block has been received, when a received packet at the requestor device is not an out of order packet;

process the SACK block for the acknowledgement packet and updating a data structure that tracks retransmit packets from the requestor device; and invoke a retransmit process to retransmit packets from the requestor device to the responder device.

15. The storage medium of claim 14, wherein the requestor device and the responder device are remote direct memory access (RDMA) nodes.

16. The storage medium of claim 15, wherein the RDMA nodes are configured to process InfiniB and packets.

17. The storage medium of claim 16, wherein the LRCETH is included in an extended header (ETH) of each InfiniB and packet.

18. The storage medium of claim 17, wherein the LRCETH includes an acknowledgement sequence number indicating an amount of in order data that was received by a queue pair (QP).

* * * * *